Aug. 19, 1958     R. BINDER     2,848,080
TWO STAGE CLUTCH CONTROL SYSTEM
Filed Feb. 24, 1955     2 Sheets-Sheet 1
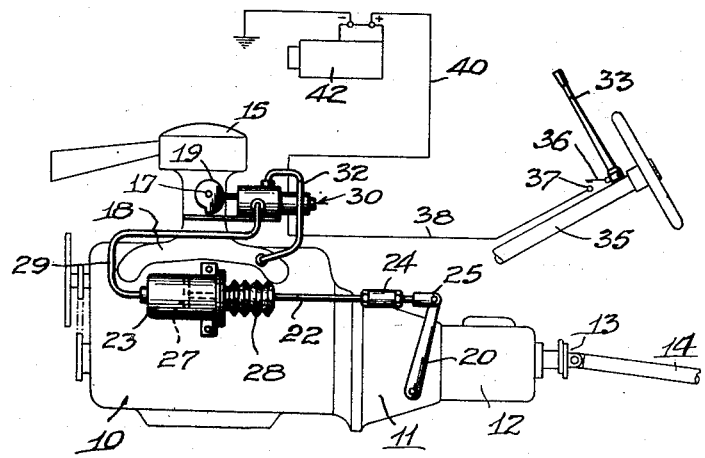
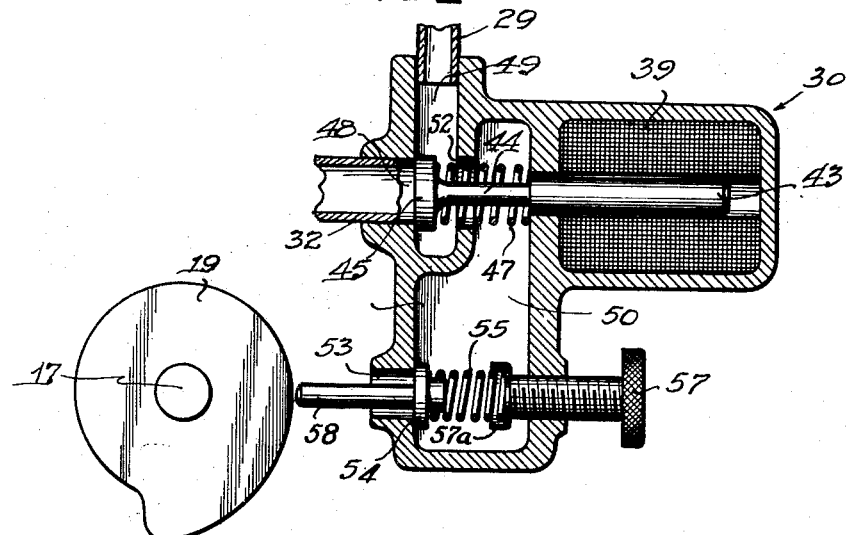
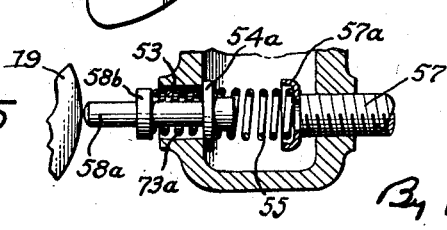
INVENTOR
RICHARD BINDER Aug. 19, 1958

R. BINDER 2,848,080

TWO STAGE CLUTCH CONTROL SYSTEM

Filed Feb. 24, 1955

INVENTOR
RICHARD BINDER

By Richardson, David and Nordan
his ATT'YS.

United States Patent Office 2,848,080
Patented Aug. 19, 1958

2,848,080

TWO STAGE CLUTCH CONTROL SYSTEM

Richard Binder, Schweinfurt am Main, Germany, assignor to Fichtel & Sachs A. G., Schweinfurt am Main, Germany, a corporation of Germany Application February 24, 1955, Serial No. 490,360

Claims priority, application Germany March 4, 1954

8 Claims. (Cl. 192—.052)

The present invention relates to automatic clutch control systems and more particularly to systems of this character which are suitable for automotive use and comprising a clutch which engages whenever the engine speed exceeds a predetermined minimum speed, the clutch being disengaged by means of a suction or pressure operated servomotor during the shifting of gear during times when the engine speed exceeds the predetermined minimum speed and the clutch would otherwise be engaged.

An automatic clutch control system of the type with which the present invention is suitable for use is described in the pending application of Richard Binder, Serial No. 466,410, filed November 2, 1954, now Patent No. 2,800,208, dated July 23, 1957.

The invention contemplates the use of a clutch which automatically becomes engaged whenever the engine speed exceeds a predetermined minimum speed. During gear shifting, a fluid pressure actuated device or servomotor responsive to pressure changes disengages the clutch and allows it to reengage smoothly. The present invention is particularly concerned with a control for the servomotor which causes the clutch to reengage in two stages or steps, a partial preliminary engagement being effected during the first stage followed by a full normal driving engagement during the second stage. The transition from the first stage to the second stage is effected by pressure regulating means coordinated with and controlled by or along with the engine speed. The present invention avoids jerky reengagement of the clutch, particularly when shifting back from a higher to a lower gear ratio.

Various objects, features and advantages of the invention will become apparent upon reading the following specification together with the accompanying drawing forming a part thereof.

Referring to the drawing:

Figure 1 is a diagrammatic elevational view of a suction operated clutch control system embodying the invention.

Figure 2 is an enlarged sectional view in elevation of a clutch control valve used in the system of Fig. 1.

Figure 5 is a fragmentary view of the valve as shown in Fig. 2 illustrating a modified form of construction in which a counter spring is interposed between the movable valve member and the valve actuating rod.

Figure 3:
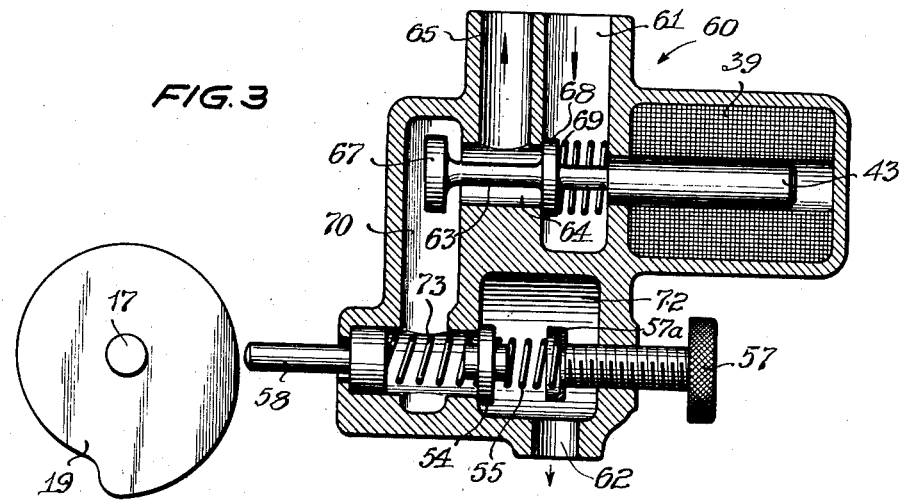
Figure 3 is an enlarged sectional view in elevation of a modified form of clutch control valve similar to the valve shown in Fig. 2, except for use with fluid pressure operated system instead of a suction operated system.

Referring to Fig. 1, an internal combustion engine designated generally as 10 is connected through a centrifugal clutch 11, a gear shift transmission 12 and a universal joint 13 to a drive shaft or propeller shaft 14 which extends to a differential or other device (not shown) for the propulsion of a vehicle for which the engine 10 provides a source of motive power.

The engine 10 is supplied with a combustible fuel-air mixture by a carburetor 15. The rate of flow of the fuel-air mixture from carburetor 15 to engine 10 is controlled by the usual butterfly valve comprising a throttle shaft 17, the valve being interposed between the carburetor 15 and the intake manifold 18 of the engine 10. The speed and torque of engine 10 are thus varied and controlled by rotation of throttle shaft 17 which has a cam 19 fixedly disposed thereon for rotation therewith. In the arrangement illustrated, the engine speed and torque are increased by counterclockwise rotation of shaft 17 and cam 19, as viewed in any of Figs. 1, 2 or 3.

The centrifugal clutch 11 becomes engaged and connects engine 10 to transmission 12 whenever the speed of engine 10 exceeds a predetermined minimum speed, becoming automatically disengaged whenever the engine speed drops to idling speed and remaining disengaged until the engine speed becomes high enough to provide sufficient power to drive the vehicle. Conveniently, the clutch may be of a type described in detail in said pending application of Richard Binder, Serial No. 466,410, filed November 2, 1954, the clutch being illustrated in Figs. 2 and 3 of the drawing thereof.

The centrifugal clutch 11, when otherwise engaged by an engine speed exceeding the predetermined minimum engine speed, may be disengaged by counterclockwise rotation of a master clutch disengaging lever 20 which is connected by a pull rod 22 to a suction actuated servomotor 23 mounted on engine 10. The pull rod 22 includes intermediate its ends an adjustable turnbuckle type coupling 24 and is connected at its right hand end to the upper free end of master clutch control lever 20 by a bifurcated coupling member 25.

The servomotor 23 comprises a horizontally slidable pressure actuated piston 27 fixed to the left hand end of pull rod 22. A flexible boot 28 encloses the left hand portion of pull rod 22 immediately adjacent to servomotor 23.

A suction line 29 connects the space at the left of piston 27 to an electropneumatic control valve designated generally as 30. A further suction line 32 permanently and continuously connects the control valve 30 to the intake manifold 18 which serves a source of suction for the operation of servomotor 23 while engine 10 is running.

Figure 4:
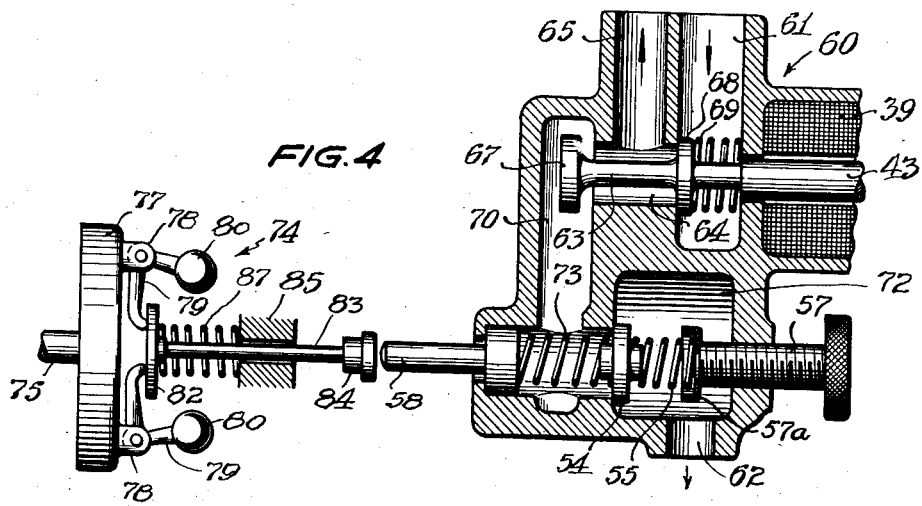
Figure 4 is a view similar to Fig. 3, an engine driven centrifugal device being arranged to cause the transition from partial clutch engagement to full driving engagement.

A manually operable gear shift lever 33 is mounted on a steering column 35 and is operatively associated through conventional means (not shown) with the transmission 12 for selecting different gear ratios therein, including the usual neutral condition in which the clutch 11 is disconnected from the propeller shaft 14. A pair of normally open contacts 36 and 37 are controlled by gear shift lever 33, the movable contact 36 being grounded through gear shift lever 33 and steering column 35. During gear shifting movement of gear shift lever 33, and while the lever 33 is in any transitory position between definite gear ratio selecting positions, the normally open contacts 36 and 37 are closed. In each active or driving position of lever 33 and in the neutral position, contacts 36 and 37 are open. Stationary contact 37 is connected via a conductor 38 to the operating winding 39 (Fig. 2) of electropneumatic valve 30. A further conductor 40 connects the operating winding 39 to a suitable source of electrical energy having one of its terminals grounded, such a source being illustratively shown as a generator 42 which may be driven in the usual manner by the engine 10. A preferred form of control circuit for electropneumatic valve 30 is shown in Fig. 4 of said application Serial No. 466,410 and is so arranged that the electropneumatic control valve becomes operative for clutch control purposes only after the enginge speed reaches a value somewhat below the predetermined minimum speed at which clutch engagement takes place.

Referring to Fig. 2, the valve operating winding 39 surrounds a solenoid plunger 43 which is horizontally slidably disposed therein. The plunger 43 is fixedly connected by a valve stem 44 with a valve head 45 which is yieldingly urged leftwardly by a helical compression spring 47 mounted on and surrounding the valve stem 44. The spring 47 urges the valve head 45 into seating engagement with portions of the valve body adjacent to the edges of a suction passage 48. Suction passage 48 is permanently and continuously connected to intake manifold 18 by suction line 32 as described above.

Suction line 29 which extends to servomotor 23 is connected to a servomotor control passage 49 formed in the body of control valve 30. The servomotor control passage 49 communicates with a pressure restoration chamber 50 through an aperture 52 through which the compression spring 47 passes.

The pressure restoration chamber 50 communicates with the atmosphere through a passage 53 which is normally closed off by pressure regulating valve member 54. The pressure differential which is required to unseat valve member 54 and admit air to pressure restoration chamber 50 is determined by a helical compression spring 55 which yieldingly urges valve member 54 leftwardly into its seated position. The pressure differential required to unseat valve member 54 may be adjusted by a knurled-headed adjusting screw 57 having a cup-shaped left hand end 57a which receives the right hand end of compression spring 55. The valve member 54 is provided with a leftwardly projecting extension 58 the tip of which acts as a displaceable control member and operates as a cam follower with respect to cam 19.

In operation, when the engine is running at a speed higher than the predetermined minimum clutch engaging speed, gear shifting movement of gear shift lever 33 through any of its transitory positions closes contacts 36, 37 and energizes operating winding 39 of control valve 30 thereby drawing solenoid plunger 43 to the right. This unseats valve head 45 and places servomotor 23 in direct communication with intake manifold 18 through suction lines 29 and 32 which are then connected together through suction passage 48 and servomotor control passage 49 of valve 30. At the same time, aperture 52 is closed by valve head 45 thereby shutting off communication between the suction line 29 and pressure restoration chamber 50. Servomotor 23 thereupon operates master clutch disengaging lever 20 in a counterclockwise direction and clutch 11 immediately becomes disengaged and remains disengaged during the manipulation of gear shift lever 33.

After the gear shifting has been completed and the desired gear ratio has been selected in transmission 12, operating winding 39 is deenergized by the opening of contacts 36 and 37. Valve head 45 moves to the left under the influence of compression spring 47, shutting off the connection to suction line 32 and opening aperture 52, thereby connecting suction line 29 from servomotor 23 with pressure restoration chamber 50. Pressure regulating valve member 54 thereupon opens and admits atmospheric air to chamber 50 until the pressure differential determined by compression spring 55 is attained. This increased pressure, which is less than atmospheric pressure, acts on servomotor 23 to permit partial reengagement of clutch 11. The cam 19 is in a position where it does not engage the displaceable control member extension 58 of valve member 54 and corresponds to a condition of reduced fuel supply to engine 10 such that the torque to be transmitted through clutch 11 is relatively low. This partial reengagement will therefore suffice to bring the driving and driven members of clutch 11 smoothly to the same speed.

When an increased supply of fuel is furnished to engine 10 producing an increased speed and driving torque, shaft 17 and cam 19 rotate counterclockwise and cam 19 engages the tip of extension 58 of valve member 54, opening the valve against the yielding pressure of spring 55 and admitting air to pressure restoration chamber 50 so that full atmospheric pressure is attained in chamber 50. This, in turn, supplies full atmospheric pressure to servomotor 23 thereby causing full engagement of clutch 11.

Fig. 3 shows a modified form of control valve which is adapted for use with a fluid pressure operated servomotor instead of the suction operated servomotor 23 described above, pressure fluid being admitted at the right hand side of piston 27 instead of suction at the left hand side as shown. The pressure fluid may be air or hydraulic fluid such as oil.

The control valve for pressure fluid is designated generally as 60 and is connected in the control system substantially as described above for Figs. 1 and 2, except for the changes involved in using a fluid pressure actuated servomotor instead of a suction actuated servomotor. The control valve 60 comprises an operating winding 39 and solenoid plunger 43 which are connected and controlled as described above.

The control valve 60 comprises an inlet passage 61 which is permanently connected to a source of fluid under pressure (not shown), such as a tank of compressed air, a hydraulic accumulator or the like. At the bottom of the control valve 60 there is provided an outlet or exhaust passage 62 for spent pressure fluid which communicates with the atmosphere if the pressure fluid is compressed air, or connected to a suitable hydraulic return line if hydraulic fluid is used.

The solenoid plunger 43 is connected to a valve stem 63 which passes through a horizontal fluid passage 64. The horizontal fluid passage 64 is in continuous communication with a control passage 65 which is connected by a suitable conduit (not shown) with the servomotor 23 for operation thereof under the control of valve 60. The valve stem 63 carries spaced valve heads 67 and 68 which are selectively movable to close the left or the right hand end, respectively, of horizontal fluid passage 64. A helical compression spring 69, which surrounds the right hand end portion of valve stem 63, normally yieldingly urges valve head 68 into seating engagement to close the right hand end of horizontal fluid passage 64 at the same time causing the left valve head 67 to open the left hand end of horizontal fluid passage 64, thereby placing control outlet passage 65 normally in communication with a fluid exhaust passage 70. Energization of operating winding 39, as described above, draws solenoid plunger 43 and valve stem 63 toward the right causing valve head 67 to close the left hand end of horizontal fluid passage 64 and valve head 68 simultaneously to open the right hand end of fluid passage 64 admitting pressure fluid from inlet passage 61 to the servomotor 23 through control passage 65. This actuates servomotor 23 to disengage clutch 11 during the shifting of gears by gear shift lever 33, as described above.

The exhaust passage 70 communicates with an outlet chamber 72 through a pressure regulating valve comprising a valve member 54, a pressure regulating compression spring 55 and adjusting screw 57 as described above in connection with Fig. 2. The extension 58 of valve member 54, however, is shown connected thereto through a counter spring 73 which is a helical compression spring arranged to oppose the action of regulating spring 55. When operating winding 39 is deenergized, pressure fluid from servomotor 23 will flow back through control passage 65 and downwardly through exhaust passage 70 and past pressure regulating valve member 54 into outlet chamber 72 until the pressure in the servomotor 23 drops to a pressure determined by the setting of adjusting screw 57. This pressure is selected to cause partial reengagement of clutch 11 as described above. Thereafter, as cam 19 rotates in a counterclockwise direction with increasing fuel supply to engine 10, extension 58 is moved toward the right gradually applying pressure to valve member 54 through counter spring 73 and thereby gradually permitting a further reduction in the pressure in control passage 65 until valve member 54 is fully open and the pressure drops to a minimum. The clutch 11 is thus more gradually reengaged through the progressive action of counter spring 73 than in the case of the rigid extension 58 shown in Fig. 2.

Fig. 4 shows a modified form of control system in which the cam 19 has been replaced by an engine driven centrifugal device designated generally as 74. The centrifugal device 74 comprises an engine driven shaft 75 connected by any desired means (not shown) to rotate with engine 10 so that the speed of shaft 75 corresponds and is proportionally related to the speed of engine 10.

At its right hand end the shaft 75 carries a revolving disc 77. On its right hand face the disc 77 is provided with two pairs of spaced ears 78 in which bell crank levers 79 are pivotally mounted. At their free generally axially extending ends, the bell crank levers 79 carry centrifugal ball weights 80. The radially inwardly extending ends of bell crank levers 79 are curved to the right for engagement with a disc 82 mounted on an axially movable shaft 83 which terminates at its right hand end in a head portion 84. The shaft 83 passes freely through a partition 85. A helical compression spring 87 surrounds shaft 83 with its right hand end bearing against partition 85 and the opposite end yieldingly urging disc 82 into engagement with the curved ends of bell crank levers 79.

In operation, the centrifugal force acting on weights 80 urges them radially outwardly causing the curved ends of bell crank levers 79 to press disc 82 toward the right against the action of compression spring 87. When the speed of engine 10 reaches a sufficiently high value, the head portion 84 of shaft 83 engages the end of the displaceable control member extension 58 and acts on counter spring 73 to reduce the pressure required to open valve member 54 and permit the flow of pressure fluid from exhaust passage 70 into outlet chamber 72. The reengagement of clutch 11 is thus controlled gradually as a direct fuction of engine speed rather than as a function of fuel supply to the engine which latter type of control is provided by the cam 19 shown in Figs. 1 to 3.

Fig. 5 illustrates a modification of Fig. 2 wherein a counter spring 73a is provided which corresponds to the counter spring 73 shown in Figs. 3 and 4. The projection 58 of valve member 54 is shown replaced by a rod 58a which is axially slidable through the valve member 54a. The tip of rod 54a acts as a cam follower engaging cam 19. The counter spring 73a is mounted on and surrounds the rod 58a, one end of counter spring 73a bears against a collar 58b fixed to rod 58a. The other end of counter spring 73a is adapted to bear against and unseat the valve member 54a when cam 19 is rotated counterclockwise as described above for Fig. 2.

There have been shown and described what are believed to be the best embodiments of the invention. However, it will be apparent to those skilled in the art that many changes and modifications may be made in the specific embodiments of the invention which are herein disclosed without departing from the scope of the invention as defined in the appended claims. As used in the claims, the term "pressure fluid" includes air at atmospheric and sub-atmospheric pressures as illustrated in the manifold suction operated embodiment of Figs. 1 and 2 as well as compressible or incompressible fluid at pressures equal to and higher than atmospheric pressure as shown in Figs. 3 and 4.

What is claimed is:

1. In combination with an internal combustion engine; throttle means for controlling the speed and torque of said engine; a transmission; gear shifting means for selecting a desired gear ratio within said transmission; a clutch selectively engageably and disengageably connecting said engine to said transmission, said clutch permitting partial engagement thereof accompanied by a reduction in the amount of torque transmissible therethrough; and means responsive to the speed of said engine for causing engagement of said clutch whenever said engine speed exceeds a predetermined minimum speed, the provision of: servomotor means operable in response to exchange in the pressure of a pressure fluid therein for disengaging said clutch during times when said engine speed exceeds said predetermined minimum speed and said clutch would otherwise be engaged; control valve means connected to said servomotor means for causing a change in the pressure of said pressure fluid, flow of said pressure fluid to and from said servomotor means being controlled by said valve means; control means interconnecting said gear shifting means and said control valve means, said control means causing said valve means to change the fluid pressure in said servomotor means for causing complete disengagement of said clutch during shifting actuation of said gear shifting means; pressure regulating means connected with said valve means for causing a pressure change in said servomotor pressure fluid for partially reengaging said clutch after termination of said shifting actuation of said gear shifting means; releasing means, for causing full engagement of said clutch, said releasing means including a displaceable control member acting on said pressure regulating means; and means included in said releasing means for varying the position of said displaceable control member in accordance with variations in said engine speed to cause full engagement of said clutch when said engine speed equals or exceeds a predetermined minimum driving speed, said minimum driving speed being greater than said first-named minimum engine speed at which clutch engagement takes place.

2. The combination according to claim 1, further comprising resilient means interposed between said pressure regulating means and said displaceable control member.

3. The combination according to claim 1, wherein said engine comprises an intake manifold connected to said valve means and in which said servomotor means is actuated by suction derived from said manifold.

4. The combination according to claim 1, wherein said means for varying the position of said displaceable control member is a centrifugally operated device driven by said engine.

5. In combination with an internal combustion engine; throttle means for controlling the speed and torque of said engine; a transmission; gear shifting means for selecting a desired gear ratio within said transmission; a clutch selectively engageably and disengageably connecting said engine to said transmission, said clutch permitting partial engagement thereof accompanied by a reduction in the amount of torque transmissible therethrough; and means responsive to the speed of said engine for causing engagement of said clutch whenever said engine speed exceeds a predetermined minimum speed, the provision of: fluid pressure actuated servomotor means for disengaging said clutch during times when said engine speed exceeds said predetermined minimum speed and said clutch would otherwise be engaged; electrically operated control valve means connected to said servomotor means for effecting a pressure change in a pressure fluid in said servomotor means, flow of said pressure fluid to and from said servomotor means being controlled by said valve means; an energizing circuit for said valve means, said energizing circuit including contacts controlled by said gear shifting means during shifting actuation thereof and causing said valve means to effect a pressure change in said pressure fluid in said servomotor means for causing complete disengagement of said clutch during shifting actuation of said gear shifting means; pressure regulating means connected with said valve means for causing a pressure change in the pressure fluid in said servomotor means for partially re-engaging said clutch after termination of said shifting actuation of said gear shifting means; releasing means for causing full engagement of said clutch, said releasing means including a displaceable control member acting on said pressure regulating means; and means included in said releasing means for varying the position of said displaceable control member in accordance with variations in said engine speed to cause full engagement of said clutch when said engine speed equals or exceeds a predetermined minimum driving speed, said minimum driving speed being greater than said first-named minimum engine speed at which said clutch engagement takes place.

6. The combination according to claim 5, further comprising resilient means interposed between said pressure regulating means and said displaceable control member.

7. The combination according to claim 5, wherein said engine comprises an intake manifold connected to said valve means and in which said servomotor means is actuated by suction derived from said manifold.

8. The combination according to claim 5, wherein said means for varying the position of said displaceable control member is a centrifugally operated device driven by said engine.

References Cited in the file of this patent

UNITED STATES PATENTS

| | | |
|---|---|---|
| 2,080,484 | Hunt | May 18, 1937 |
| 2,144,074 | Maybach | Jan. 17, 1939 |
| 2,163,891 | Sanford | June 27, 1939 |
| 2,164,865 | Keiper | July 4, 1939 |
| 2,168,682 | Paine | Aug. 8, 1939 |
| 2,177,662 | Kliesrath et al. | Oct. 31, 1939 |
| 2,531,711 | Thomas | Nov. 28, 1950 |
| 2,604,197 | Livermore | July 22, 1952 |
| 2,612,869 | Thomas | Oct. 7, 1952 |